US009098095B2

(12) United States Patent
Strzelczyk et al.

(10) Patent No.: US 9,098,095 B2
(45) Date of Patent: Aug. 4, 2015

(54) COOLER BYPASS ASSEMBLY

(75) Inventors: Robert B. Strzelczyk, Buffalo, NY (US); James Caroll, Novi, MI (US); Steven R. Zillig, Clarence, NY (US); James D. Messecar, Sr., Wyoming, NY (US); Michael A. Lenartowicz, Lyndonville, NY (US); Kip Stevely, Rochester Hills, MI (US); Dan Metz, Highland, MI (US)

(73) Assignee: Jiffy-tite Co., Inc., Lancaster, NY (US)

( * ) Notice: Subject to any disclaimer, the term of this patent is extended or adjusted under 35 U.S.C. 154(b) by 1409 days.

(21) Appl. No.: 12/174,152

(22) Filed: Jul. 16, 2008

(65) Prior Publication Data
US 2009/0025922 A1    Jan. 29, 2009

Related U.S. Application Data

(60) Provisional application No. 60/961,137, filed on Jul. 17, 2007.

(51) Int. Cl.
*F01P 11/16* (2006.01)
*F01P 7/16* (2006.01)
*G05D 23/02* (2006.01)

(52) U.S. Cl.
CPC ........... *G05D 23/022* (2013.01); *F01P 2025/04* (2013.01); *F01P 2025/08* (2013.01)

(58) Field of Classification Search
CPC . F01P 2007/146; F01P 7/167; F01P 2060/08; F01P 2025/62; F01P 11/16; F01P 7/16; F01M 5/007; G05D 23/1333

USPC .......... 236/34.5, 91 R, 92 C, 93 R, 93 A, 98, 236/99 R, 99 J, 100, 101; 165/297; 137/597
See application file for complete search history.

(56) References Cited

U.S. PATENT DOCUMENTS 2,457,618 A * 12/1948 Wiesendanger ............. 236/34.5
2,512,800 A    6/1950 Jensen
2,805,025 A *  9/1957 Dillman ........................ 236/1 C (Continued)

FOREIGN PATENT DOCUMENTS

DE    19933794 A    7/1999
GB      726934 A    3/1955

(Continued)

OTHER PUBLICATIONS

International Search Report issued Jan. 6, 2009.

(Continued)

*Primary Examiner* — Frantz Jules
*Assistant Examiner* — Meraj A Shaikh
(74) *Attorney, Agent, or Firm* — Young Basile Hanlon & MacFarlane P.C.

(57) ABSTRACT

A cooler bypass apparatus housing has a first fluid passageway connecting a first inlet and a first outlet port, and a second fluid passageway connecting a second inlet port and outlet port. A transverse passageway extends between the first and second fluid passageway. A first valve is disposed in the transverse passageway for one-way fluid flow from the first to the second passageway. A second valve and a thermal actuator coupled to the second valve are disposed in the second passageway. The thermal actuator moves the second valve to fluid flow blocking or fluid flow allowing positions dependent upon fluid temperature.

7 Claims, 7 Drawing Sheets

(56) References Cited

U.S. PATENT DOCUMENTS

| | | | |
|---|---|---|---|
| 3,404,837 A * | 10/1968 | James | 236/34.5 |
| 3,913,831 A * | 10/1975 | Talak | 236/34.5 |
| 4,640,534 A | 2/1987 | Hoskins et al. | |
| 4,653,573 A * | 3/1987 | Hansen | 165/297 |
| 5,271,559 A * | 12/1993 | Naujock | 237/12.3 B |
| 5,347,825 A | 9/1994 | Krist | |
| 5,586,449 A | 12/1996 | Krist | |
| 5,622,203 A * | 4/1997 | Givler et al. | 137/337 |
| 5,992,515 A | 11/1999 | Spiegel | |
| 6,012,550 A | 1/2000 | Lee | |
| 6,021,808 A * | 2/2000 | Dulac | 137/487 |
| 6,253,837 B1 | 7/2001 | Seiler et al. | |
| 6,499,666 B1 | 12/2002 | Brown | |
| 6,527,046 B1 | 3/2003 | White | |
| 6,719,208 B2 | 4/2004 | Brown | |
| 6,740,000 B2 | 5/2004 | Wakayama | |
| 6,772,958 B1 | 8/2004 | Lamb et al. | |
| 6,799,631 B2 | 10/2004 | Acre | |
| 6,830,527 B2 | 12/2004 | Wakayama | |
| 6,935,569 B2 | 8/2005 | Brown et al. | |
| 6,962,295 B2 | 11/2005 | Ieda | |
| 6,988,364 B1 | 1/2006 | Lamb et al. | |
| 7,168,397 B2 * | 1/2007 | Chanfreau et al. | 123/41.01 |
| 7,299,994 B2 | 11/2007 | Brown et al. | |
| 7,487,826 B2 | 2/2009 | Pineo et al. | |
| 7,540,431 B2 | 6/2009 | Kozdras et al. | |
| 7,735,546 B2 | 6/2010 | Bird et al. | |
| 7,854,256 B2 | 12/2010 | Pineo et al. | |
| 2001/0003312 A1 | 6/2001 | Spiegel | |
| 2002/0128107 A1 | 9/2002 | Wakayama | |
| 2003/0019620 A1 | 1/2003 | Pineo et al. | |
| 2003/0136855 A1 | 7/2003 | Brown | |
| 2004/0134650 A1 | 7/2004 | Acre | |
| 2004/0232249 A1 | 11/2004 | Brown et al. | |
| 2005/0145706 A1 | 7/2005 | Cardinali Ieda | |
| 2006/0016900 A1 * | 1/2006 | Brown et al. | 236/34.5 |
| 2006/0076129 A1 | 4/2006 | Eliades et al. | |
| 2006/0108435 A1 | 5/2006 | Kazdras et al. | |
| 2006/0201455 A1 | 9/2006 | Chanfreau et al. | |
| 2007/0029398 A1 | 2/2007 | Conlin | |
| 2007/0090200 A1 | 4/2007 | Lamb et al. | |
| 2007/0137709 A1 | 6/2007 | Kempf et al. | |
| 2007/0158059 A1 | 7/2007 | Pineo et al. | |
| 2007/0164123 A1 | 7/2007 | Willers et al. | |
| 2008/0029246 A1 | 2/2008 | Fratantonio et al. | |
| 2008/0093066 A1 * | 4/2008 | Bird et al. | 165/297 |
| 2008/0110595 A1 | 5/2008 | Palanchon | |
| 2008/0245881 A1 | 10/2008 | Peric | |
| 2009/0026405 A1 | 1/2009 | Sheppard et al. | |
| 2009/0304531 A1 | 12/2009 | Vanderwees | |
| 2010/0126594 A1 | 5/2010 | Sheppard | |
| 2010/0126598 A1 | 5/2010 | Peric et al. | |
| 2010/0175640 A1 | 7/2010 | Sheppard | |
| 2011/0042060 A1 | 2/2011 | Pineo et al. | |

FOREIGN PATENT DOCUMENTS

| | | |
|---|---|---|
| JP | 200045773 A | 2/2000 |
| JP | 2004245245 | 9/2004 |
| JP | 3644262 | 2/2005 |

OTHER PUBLICATIONS

Written Opinion of the International Search Authority issued Jan. 6, 2009.

European Search Report for Application No./Patent No. 08826434.6-2206/2165050/PCT/US2008070179 dated Feb. 15, 2011.

English Translation of Office Action drafted Feb. 12, 2013 for Japanese Patent Application No. 2010-517136.

* cited by examiner

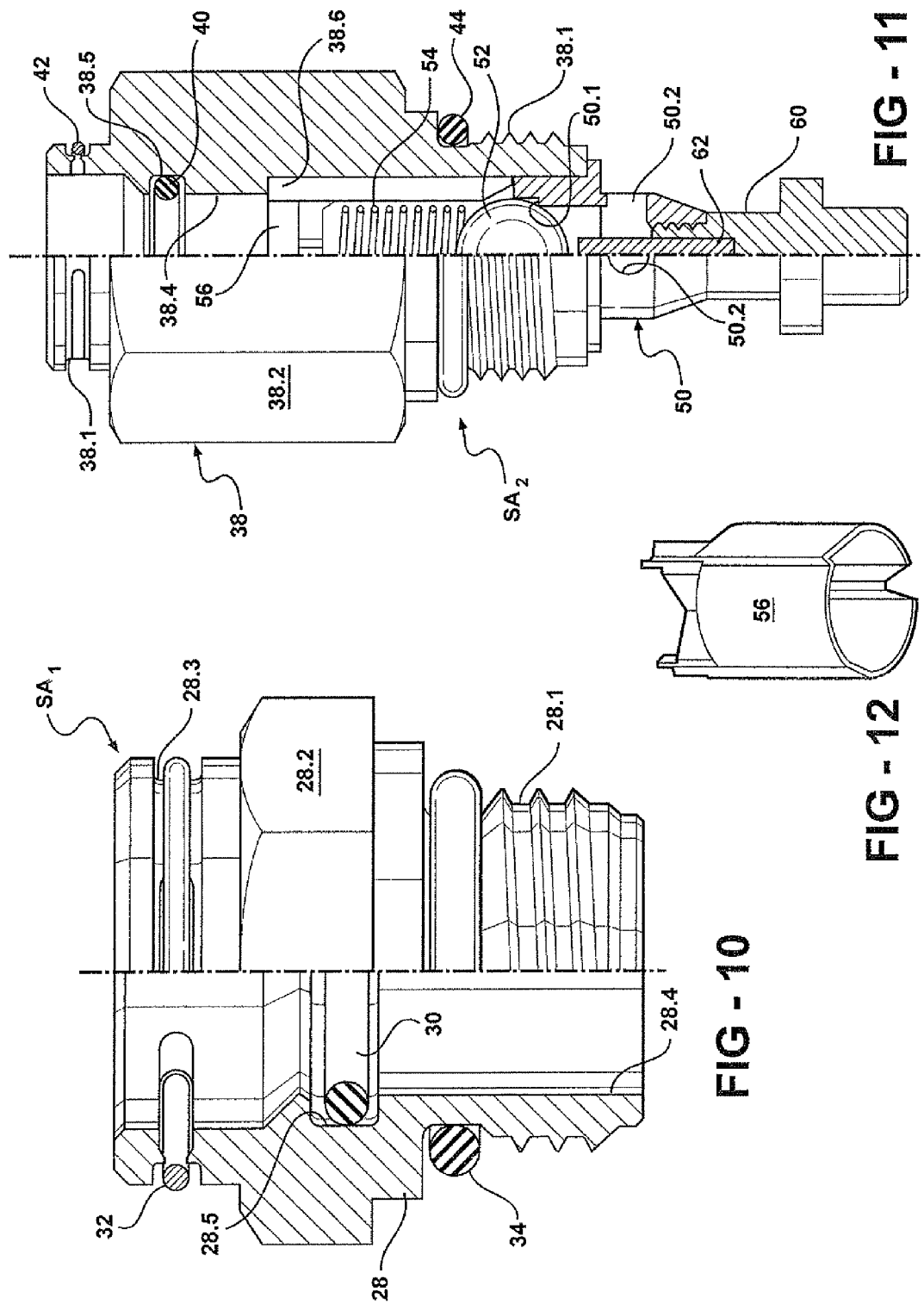

COOLER BYPASS ASSEMBLY

CROSS REFERENCE TO CO-PENDING APPLICATION

This application claims the priority benefit of the filing date of U.S. Provisional Patent Application Ser. No. 60/961,137 filed Jul. 17, 2007 for a Cooler Bypass Assembly, the entire contents of which are incorporated herein by reference.

BACKGROUND

The present invention relates to cooler bypass assemblies which permit fluid flow to a cooler only when the temperature of the fluid is above a certain temperature.

SUMMARY

It would be desirable to provide a cooler bypass apparatus which can readily be connected to machinery which has fluid which may need to be cooled, and which can also be readily connected to the cooler lines. A typical example of such machinery is an automotive transmission.

Cost reduction and fuel economy improvement initiatives brought about the need for a cooler bypass apparatus or device that can cheaply and effectively regulate transmission fluid temperatures. The apparatus ensures that the transmission fluid ramps up to optimum operating temperature as quick as possible and then regulates the fluid at the optimum temperature once it has been reached resulting in a measurable improvement in fuel economy.

The device includes a thermal relief valve circuit in addition to a separate pressure relief circuit. The thermal relief circuit includes a thermal actuator which acts upon a check valve when the optimum transmission fluid temperature has been reached, opening the valve and allowing the fluid to flow through the cooler circuit. As the fluid cools, the thermal actuator modulates the valve effectively regulating the fluid temperature. Until such time that the fluid reaches optimum temperature, the fluid is forced to re-circulate through the pressure bypass circuit which includes a check valve. The forced recirculation of fluid bypassing the cooler circuit results in a drastically reduced warm-up time as opposed to existing systems. This results in an even greater improvement in fuel economy in colder climates. Once the fluid has reached optimum temperature, the thermal relief valve opens and fluid begins circulating through the cooler circuit; the pressure relief closes and serves as a pressure "pop-off" if there is a blockage/restriction in the system of any kind in the cooler circuit, allowing the fluid to re-circulate and avoid serious damage to the machinery or transmission.

In one aspect, the cooler bypass apparatus includes a housing adapted to be secured to a structure having a fluid to be cooled. First and second inlet ports and first and second outlet ports are carried on the housing, the housing having a first fluid passageway in communication with the first inlet port and the first outlet port. A second fluid passageway in communication with the second inlet port and the second inlet port. A transverse fluid passageway is extends between the first and second fluid passageways. A first valve is disposed in the transverse fluid passageway to insure one way flow of fluid between a portion of the second fluid passageway and a portion of the first fluid passageway. A second valve and a thermal actuator are coupled to the second valve. The second valve and the thermal actuator are disposed in the second passageway. The thermal actuator moves the second valve to a position in the second fluid passageway allowing fluid flow through the second passageway when the temperature of fluid in the second passageway exceeds a threshold temperature.

BRIEF DESCRIPTION OF THE DRAWING

The various features, advantages and other uses of the present invention will become more apparent by referring to the following detailed description and drawings in which:

FIG. 10 is a view of a coupling subassembly indicated at $SA_1$ in FIG. 2;

FIG. 11 is a view of a coupling subassembly indicated at $SA_2$ in FIG. 2; and

FIG. 12 is an isometric view of the spring and ball guide shown in FIG. 9;

DETAILED DESCRIPTION

Figure 1:
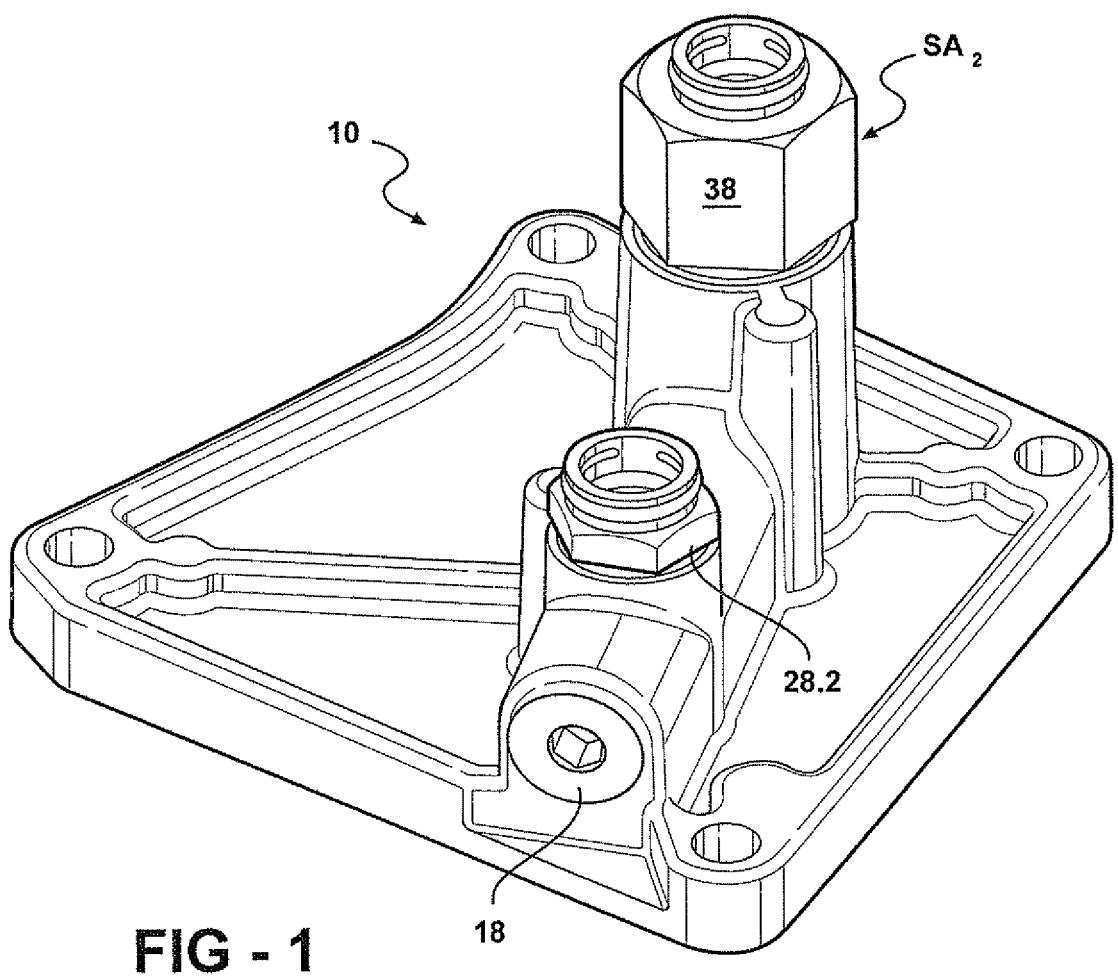
FIG. 1 is an isometric view of a cooler bypass apparatus.
Figure 2:
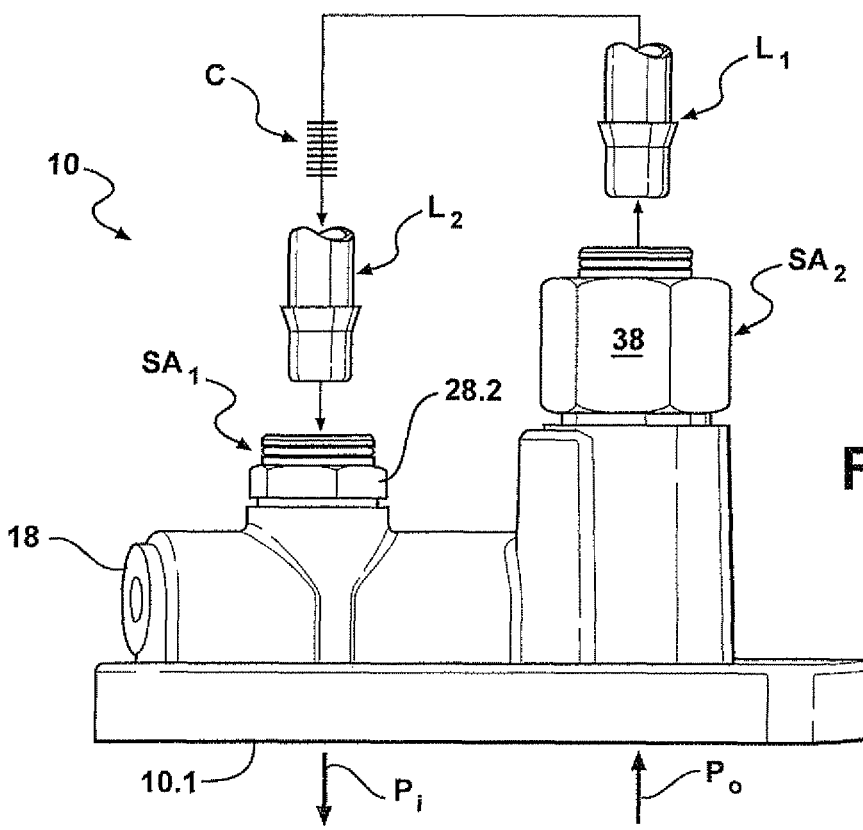
FIG. 2 is a side view of the apparatus this view further showing a cooler, and cooler lines.
Figure 3:
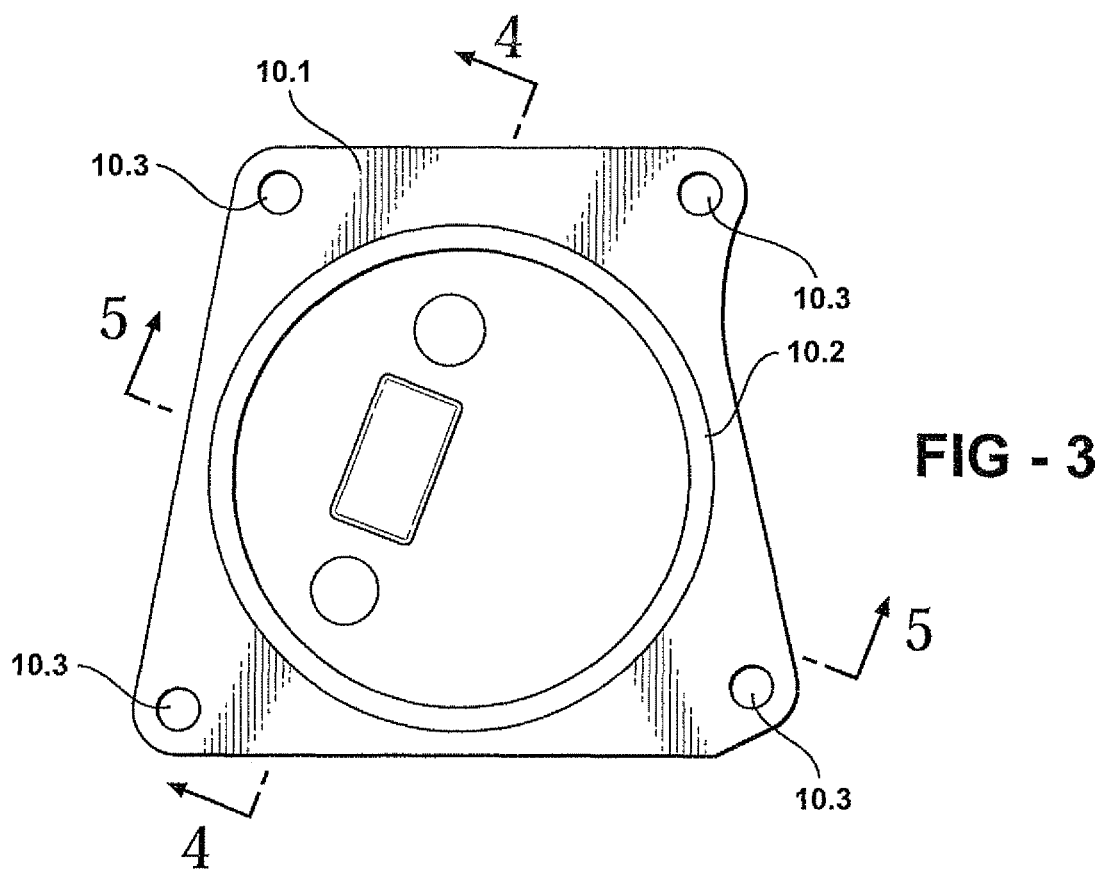
FIG. 3 is a bottom view of the apparatus.
Figure 4:
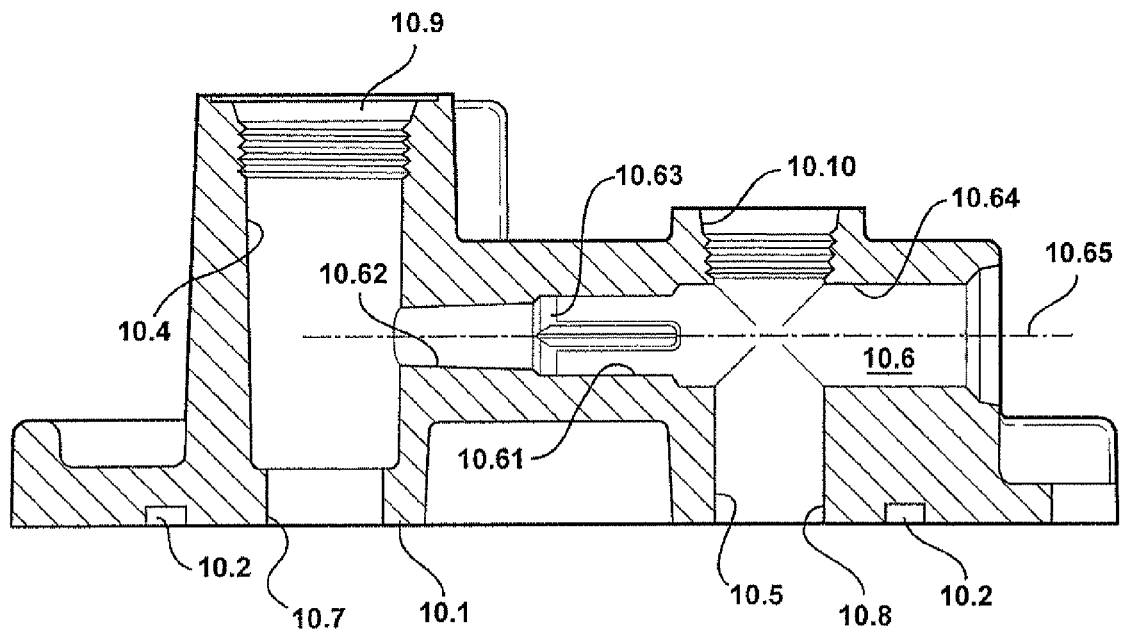
FIG. 4 is a sectional view through the casting to which various parts are assembled to form the assembly, this view being taken generally along the line 4-4 in FIG. 3.
Figure 5:
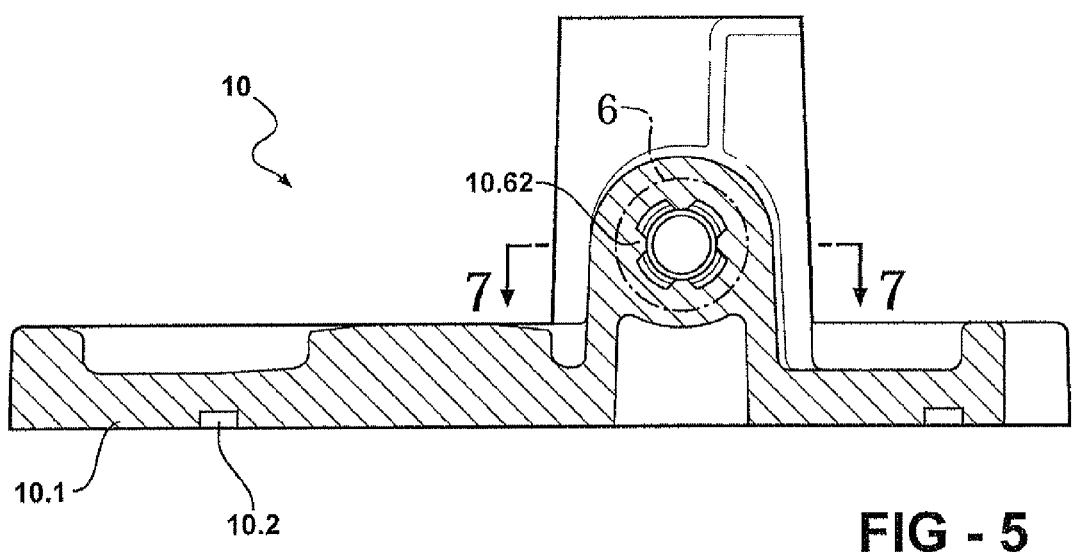
FIG. 5 is another sectional view through the casting, this view being taken generally along the line 5-5 in FIG. 3.

A cooler bypass apparatus includes a housing securable to a structure carrying a fluid to be cooled. Areas of inlet and outlet ports in the housing are coupled by first and second fluid passageways. A transverse fluid passageway extends between the first and second fluid passageways and has a first valve disposed for one way flow between the second passageway through the transverse passageway to the first fluid passageway. A second valve and a thermal actuator coupled to the second valve are disposed in the second passageway. The thermal actuator moves the second valve to a fluid flow allowing position when the temperature of the fluid exceeds a threshold.

With reference to FIGS. 1-9, a cooler bypass apparatus includes an aluminum casting or bypass mounting plate or housing indicated generally at 10 to which first and second fluid line coupling subassemblies $SA_1$ and $SA_2$ are secured, along with various other components. The casting 10 is provided with a relatively flat bottom surface 10.1 which may be secured to a corresponding flat surface on the machinery which carries a fluid that needs to be cooled. In order to insure a non-leak connection the casting 10 is provided with a groove 10.2 (FIG. 3) on its bottom surface which receives an O-ring 20. In order to secure the casting 10 to the machinery, a plurality of bolt holes 10.3 are provided through which bolts (not shown) may pass to secure the casting 10 to the machinery (not illustrated). The casting 10 is provided with two generally vertical passageways 10.4 and 10.5 and a transverse connecting passageway 10.6. As can best be seen from FIG. 4, the first vertical passageway 10.4 has an inlet port 10.7 which is adapted to be aligned with an outlet port in the machinery, and has a treaded outlet port 10.9 which is adapted to receive the first fluid line coupling subassembly $SA_1$. The second passageway 10.5 also has a threaded inlet port 10.10 which is adapted to receive the second fluid line coupling subassembly $SA_2$. Each of the first and second passageways 10.4 and 10.5 is adapted to be connected with a cooler through the fluid line coupling subassemblies $SA_1$ and $SA_2$ to cooler lines, which have special end portions $L_1$ and $L_2$, respectively. Each of the end portions $L_1$ and $L_2$ is generally tubular, but is provided with an outwardly extending abutment of ferrule. Quick connect coupler 10.6 will be described below.

Figure 6:
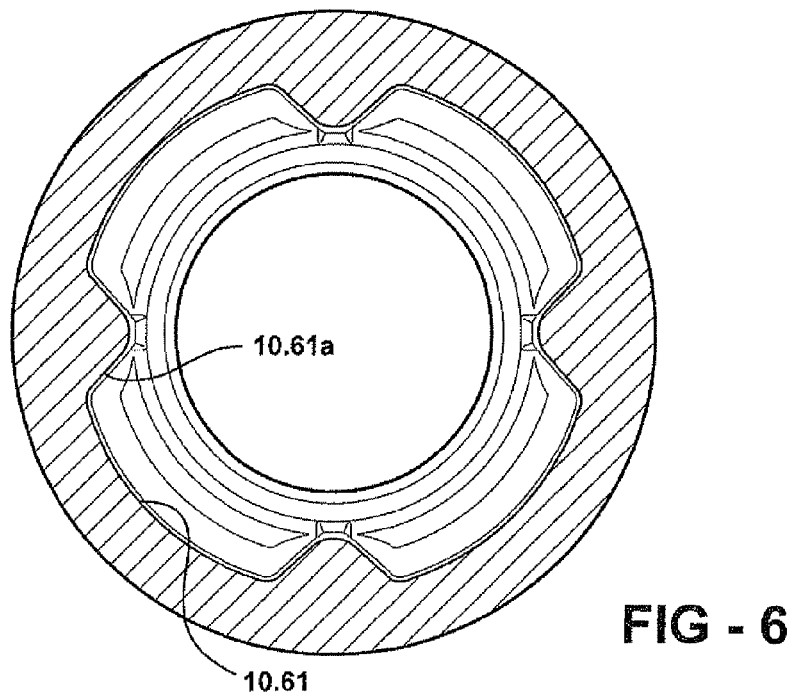
FIG. 6 is an enlarged detail of a portion of FIG. 5.
Figure 7:
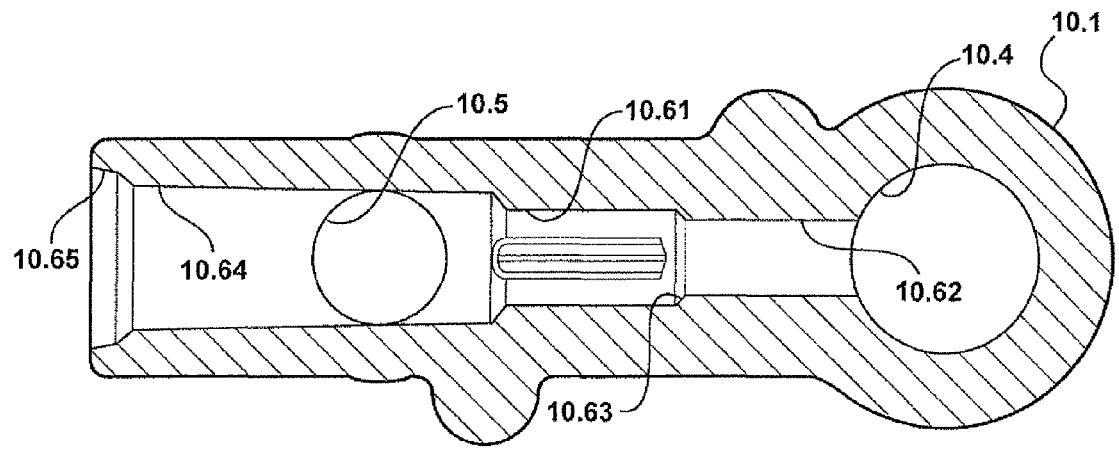
FIG. 7 is a section taken generally along the line 7-7 in FIG. 5.

As can best be seen from FIGS. 6 and 7, the transverse passageway 10.6 has first and second portions 10.61 and 10.62 of differing diameters to one side of the vertical passageway 10.5, passageway 10.61 being of a larger diameter than passageway 10.62, there being a seat 10.63 between the passageways 10.61 and 10.62 to receive a check valve such as a ballcheck valve, for example. As can best be seen from FIG. 6, the larger diameter portion 10.61 is provided with inwardly extending ribs 10.61a which act as ball guides, but which do not restrict fluid flow. The transverse passageway 10.6 also has a further large diameter portion 10.64 which extends from the vertical passageway 10.5 to the exterior of the aluminum casting 10, the end portion being threaded as at reference number 10.65 in FIG. 4.

Mounted within the casting or housing 10 are various subassemblies. The first of these subassemblies includes a check valve in the form of a ball 12, a spring 14 to normally force the ball 12 into the valve seat 10.63, and a ballcheck retainer 16 best illustrated in FIGS. 8 and 9. The ballcheck retainer 16 is provided with a relatively large diameter end portion 16.1, a relatively small diameter end portion 16.2 which is adapted to be disposed within the spring 14, flutes 16.3 which are adapted to bear against one end of the compression spring 14, and a small diameter intermediate portion disposed between the flutes 16.3 and the large diameter portion 16.1. It can be seen from an inspection of FIG. 8 that the large diameter portion 16.1 is adapted to be disposed within the larger diameter portion 10.64 of the passageway 10.6, and the small diameter portion 16.2 is adapted to lie across the passageway 10.5 so that flow through the passageway 10.5 will not be impeded.

Figure 8:
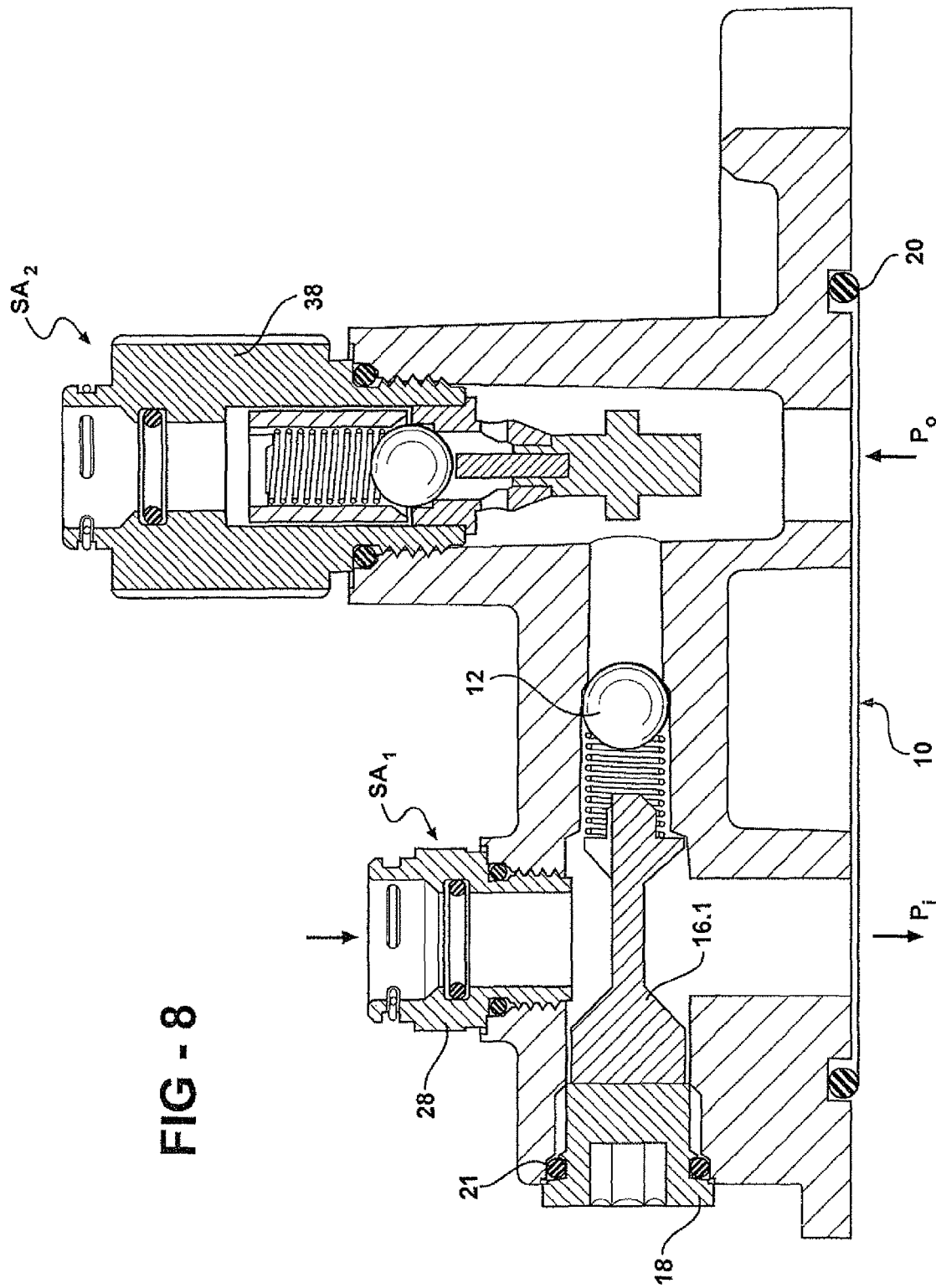
FIG. 8 is a sectional view of the assembly shown in FIG. 1.
Figure 9:
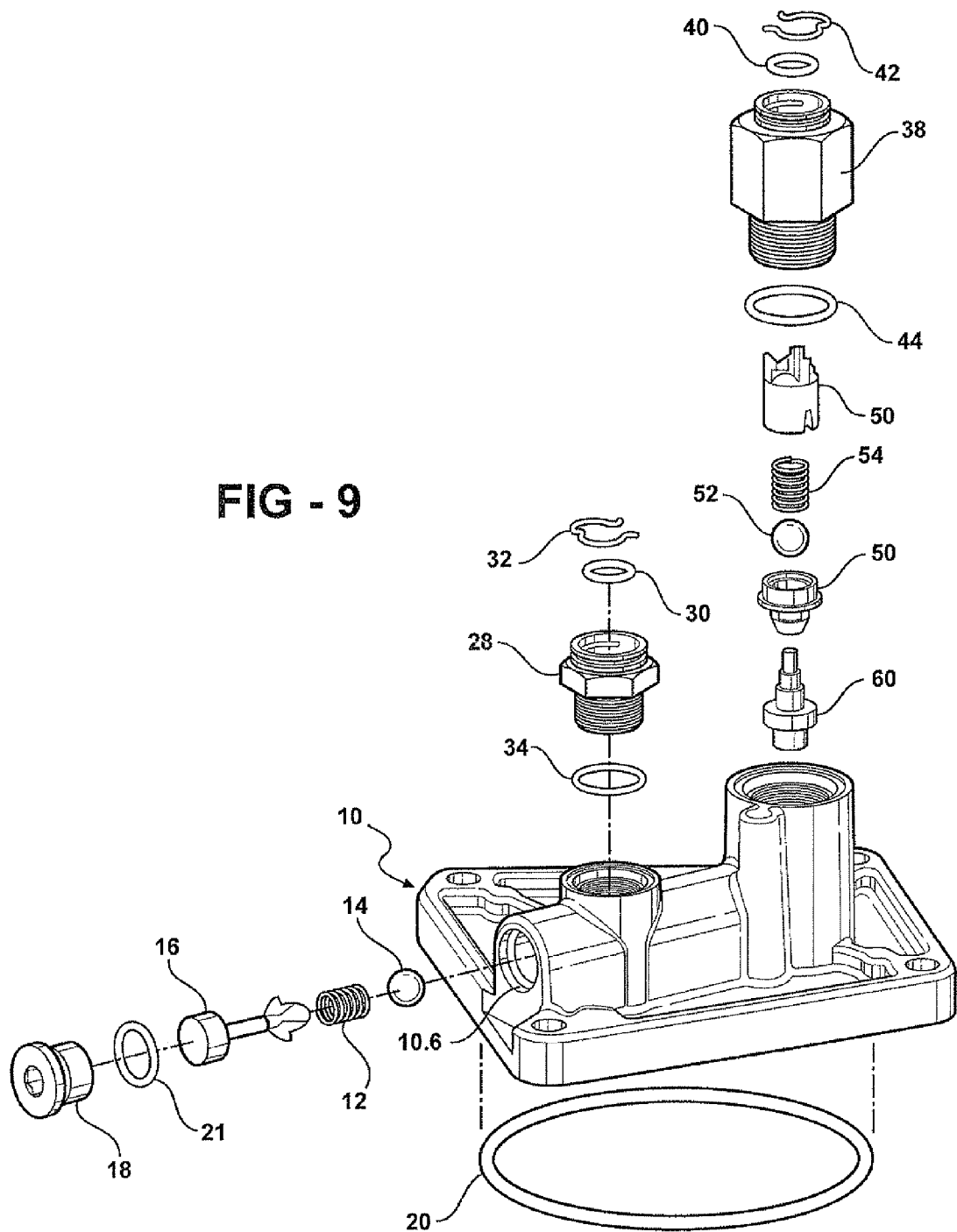
FIG. 9 is an exploded view of the assembly.

Associated with this check valve subassembly 12, 14, 16 is a plug subassembly which includes a plug 18 and an O-ring 20. When the parts are assembled, and then there is no fluid flow within the housing, the plug 18 and associated O-ring 20 will be screwed into the normally open end 10.65 of the passageway 10.6, the plug 18 and O-ring closing the end of the passageway 10.6 so no fluid can pass out of the housing 10 though the passageway 10.6. As seen in FIG. 8, the right hand end of the plug 18 will bear against the left hand end 16.1 of the retainer 16. The left hand end of the spring 14 will pass over the small diameter right-hand end 16.2 of the retainer 16, and will be held in compression, with the right hand end of the spring 14 forcing the ball 12 towards and into contact with the seat 10.63 when there is no fluid pressure within the assembly 10. At the same time the left hand end of the spring will bear against the flutes 16.3 of the retainer. When the ball 12 is against the seat 10.63, there is no flow through the passageway 10.6.

However, when the pressure within passageway 10.4 to the right of the ball 12, as viewed in FIG. 8, is greater than the spring force, the ball 12 will be forced off the seat 10.63 permitting flow from the first vertical passageway 10.4, through the smaller diameter passageway 10.62, past the seat 10.63, then into and through the larger diameter passageway 10.61, and finally into the other vertical passageway 10.5. The flutes 16.3 of the ballcheck retainer 16 permit unimpeded flow of fluid past the flutes 16.3.

The first fluid line coupling subassembly $SA_1$ is best illustrated in FIG. 10. This coupling assembly is similar to the female coupling assembly shown in U.S. Pat. No. 4,640,534, the subject matter of which is incorporated herein by reference thereto. Thus, the subassembly $SA_1$ has a principal body 28 having a fluid passageway 24.4 extending therethrough it, a first O-ring 30, a spring clip 32, and a second O-ring 34. The body 28 has a threaded end portion 28.1 which is screwed into the threaded port 10.10. The body 28 also has an enlarged portion 28.2, hexagonal in cross section, by example, which may be engaged by a wrench or the like for the purpose of screwing the body 28 into the port 10.10. The O-ring 34 is received in a groove between the threaded portion 28.1 and the hex-shaped enlarged portion 28.2 to insure a leak-tite seal when assembled. The body 28 is further provided with a groove 28.3 adjacent the end spaced away from the threaded end 28.1, the groove having suitable apertures so that it may receive the spring clip 32. The passageway 28.4 of the body 10 of the female coupler is provided with a groove 28.5 which receives O-ring 30. When the cooler line end portion is fully inserted into the fluid line coupling assembly $SA_1$, the spring clip 32 will engage on side of the abutment on the cooler line end portion to prevent it from being withdrawn, and the O-ring 30 will hear against the tubular portion to prevent leakage.

The second fluid line coupler assembly $SA_2$ is best shown in FIGS. 8 and 11. This assembly $SA_2$ includes a coupler subassembly similar to the coupler assembly $SA_1$, a ball check valve subassembly, and a thermal actuator. The coupler subassembly $SA_2$ includes a body 38 having a fluid passageway extending through it, a first O-ring 40, a spring clip 42, and a second O-ring 44. The body 38 has a threaded end portion 38.1 which is screwed into the threaded port 10.9. The body 38 also has an enlarged portion 38.2, hexagonal in cross section, for example, which may be engaged by a wrench or the like for the purpose of screwing the body 38 into the port 10.10. The O-ring 44 is received in a groove between the threaded portion 38.1 and the hex portion 38.2 to insure a leak-tite seal when assembled.

The body 38 is further provided with a groove 38.3 adjacent the end spaced away from the threaded end 38.1, the groove 38.3 having suitable apertures so that it may receive the spring clip 42. The passageway 38.4 of the body 38 of the fluid coupler is provided with a groove 38.5 which receives O-ring 40. When the cooler line end portion $L_1$ is fully inserted into the fluid line coupling assembly $SA_2$, the spring clip 42 will engage on side of the abutment on the cooler line end portion to prevent it from being withdrawn, and the O-ring 40 will bear against the tubular portion below the abutment to prevent leakage.

A cross drilled ball seat member 50 is secured to end of the passageway 38.4 remote from the spring clip 42 by force fit or any other suitable manner. The ball seat member 50 has a ball seat 50.1 which a ball 52 may rest against. The ball 52 is normally forced into contact with the seat 50.1 by a compression spring 54, the spring 54 being retained within a ballcheck sleeve 56. The sleeve 56 bears against a shoulder 38.6 in the body 10 to hold the spring 54 and ball 52 in a proper operating condition. A thermal actuator 60 is secured to the end of the ball seat member 50 at a location spaced away from the seat 50.1 suitable means, such as press fit, threads, etc.

The thermal actuator 60 has a piston 62 which may contact the ball 52. In operation, the piston 62 of the thermal actuator 60, which may be of the type sold by Caltherm of Columbus, Ind., for example, will raise the ball 52 away from the seat 50.1 when the fluid temperature is above a certain point, permitting flow through the cross drilled apertures 50.2, past the ball 52, and then into line $L_1$.

The design described above allows for any type of attachment to a mating port. The mating plate can be designed to any customer specification, and the assembly can also be incorporated into a stand-alone housing that could be connected in-line with the transmission cooling lines utilizing quick-connects.

In order to understand the operation of the cooler bypass assembly, it will be assumed that it mounted on an automatic transmission. It is well known in the art that the fluid within a transmission has a desired operating temperature, typically in the range of 175-225° F., depending upon vehicle make and model. When the automatic transmission fluid (ATF) is below this temperature, the transmission will have operating inefficiencies due to its higher viscosity, which causes the vehicle to consume more fuel. At temperatures above the desired operating temperature, the life of the ATF will begin to plummet. In order to prevent loss of life of the ATF, the transmission fluid is passed through a cooler, which may be in the automotive radiator. Alternatively, if the vehicle is equipped with a trailer towing package, the transmission fluid is passed through an external cooler. At normal ambient temperature ranges, it typically takes only about 10 minutes for the ATF to reach its desired operating temperature. However, in extreme conditions, for example, a vehicle having an external cooler which is not towing a trailer, and when the temperature is quite cold, for example, 10° F., the ATF fluid may never attain the desired operating temperature range if passed through a cooler. In any event, passing the ATF through a cooler decreases the efficiency of a vehicle until the desired operating temperature has been achieved.

In operation, the cooler bypass assembly will be secured to the transmission with the inlet port 10.7 in communication with the ATF outlet port indicated by the arrow $P_o$ and with the outlet port 10.8 in communication with the AFT inlet port $P_i$. When the vehicle is initially started, the ATF will be at ambient temperature, for example 55° F. At this temperature, it will flow through port $P_o$ into the inlet port 10.7 and then through the transverse passageway 10.6, and then out of the assembly through outlet port 10.8 and inlet port $P_i$. It will not flow to the cooler, as the temperature is not high enough to cause the thermal actuator 60 to expand and raise the ball 52 against the spring pressure to permit ATF flow past the ball 52 and to the cooler represented graphically at C in FIG. 2. If for any reason the cooler restricts flow, the ball 12 will open up, allowing bypass of the fluid past the cooler.

What is claimed is:

1. A cooler bypass apparatus comprising:
a housing adapted to be secured to a structure having a fluid to be cooled; first and second inlet ports and first and second outlet ports carried on the housing, the housing having a second fluid passageway in communication with the first inlet port and the first outlet port, a first fluid passageway in communication with the second inlet port and the second outlet port, and a transverse fluid passageway extending between the first and second fluid passageways;
a first fluid pressure responsive valve disposed in the transverse fluid passageway to insure one way flow of fluid between a portion of the second fluid passageway and a portion of the first fluid passageway; and
a second valve and a thermal actuator coupled to the second valve, the second valve and the thermal actuator disposed in the second fluid passageway, the thermal actuator moving the second valve to a fluid flow allowing position in the second fluid passageway allowing fluid flow through the second fluid passageway when the temperature of fluid in the second passageway exceeds a threshold temperature; and wherein
the thermal actuator allows a movable valve member of the second valve to close the second fluid passageway to block fluid flow through the first outlet when the temperature of the fluid in the second fluid passageway is below the threshold temperature, the blocked fluid flow creates a pressure differential between the second passageway and the first passageway, the pressure differential causing the first valve to move to a position in the transverse fluid passageway allowing exclusive flow of fluid from the second passageway to the first passageway through the transverse passageway.

2. The cooler bypass apparatus of claim 1 wherein the thermal actuator comprises:
an extendable piston engageable with the second valve to allow the second valve to move to the closed position when the piston is retracted.

3. The cooler bypass apparatus of claim 1 wherein the second valve comprises:
the movable valve member disposed in the second fluid passageway;
and engageable by the thermal actuator; and
a biasing spring disposed in the second passageway for normally biasing the movable valve member to a fluid flow blocking closed position.

4. The cooler bypass apparatus of claim 3 wherein the movable valve member comprises:
a ball movably disposed with respect to a ball seat in the second passageway.

5. The cooler bypass apparatus of claim 1 wherein the first valve comprises:
a spring biased check valve normally disposed in a fluid blocking position in the transverse fluid passageway preventing fluid flow from the second fluid passageway to the first fluid passageway.

6. The cooler bypass apparatus of claim 5 wherein:
the check valve is moved to a position allowing fluid flow from the second fluid passageway to the first fluid passageway by fluid flow when the second valve is in the closed position.

7. The cooler bypass apparatus of claim 1 further comprising:
a separate body fixed to the housing and disposed in fluid flow communication with the second passageway, the body defining, in part, the second passageway and the first outlet;
the second valve including a single check ball disposed in the body;
a ball seat carried in the body;
biasing means, carried in the body, for normally biasing the check ball to a fluid flow blocking position in the body; and
the thermal actuator fixedly carried in the body and having an extensible and retractable piston, the piston engageable with and moving the check ball from a sealed fluid flow blocking position in contact with the ball seat in the body when the piston is in an extended position, and allowing the biasing means to move the check ball into sealed contact with the ball seat in the body when the piston is in a retracted position.

* * * * *